United States Patent [19]

Byron et al.

[11] Patent Number: 5,574,810
[45] Date of Patent: Nov. 12, 1996

[54] INCUBATED BRAGG GRATINGS IN WAVEGUIDES

[75] Inventors: Kevin C. Byron, Bishop's Stortford; Peter Dyer, N. Humbs.; Robert Farley, N. Humbs.; Roswitha Giedl, N. Humbs., all of United Kingdom

[73] Assignee: Northern Telecom Limited, Montreal, Canada

[21] Appl. No.: 456,959

[22] Filed: Jun. 1, 1995

[30] Foreign Application Priority Data

Jun. 1, 1994 [GB] United Kingdom .................. 9410996

[51] Int. Cl.$^6$ .................................................. G02B 6/34
[52] U.S. Cl. ........................................................ 385/37
[58] Field of Search ............................... 385/27, 31, 37, 385/39

[56] References Cited

PUBLICATIONS

"High Reflectivity Fiber Gratings Produced By Incubated Damage Using a 193 nm Ar Flaser" By Dyer et al., Electronices Letters, vol. 30, No. 11, May 26, 1994, pp. 860–862.
"Photosensitivity in Ge–doped Silica Optical Waveguides and Fiberes with 193nm Light From an ArF Excimer laser", by Albert et al. Optics Letters, vol. 19, No. 6, Mar. 15, 1994, pp. 387–389.

"Bragg Grating Fabrication In Monomode Photosensitive Optical Fiber By UV Exposure Through a Phase Mask" by Hill et al. Application Phys. Letters, vol. 62, Nov. 10. Mar. 8, 1993, pp. 1035–1037.
Dyer, "High Reflectivity Fibre Gratings Produced By Incubated Damage Using a 193nm Ar Flaser", Electronics Letters, vol. 30, No. 11, May 26, 1994, pp. 860–862.
Albert, "Photosensitivity in Ge–doped Silica Optical Waveguides and Fibres With 193nm Light From an Ar F Excimer Laser", Optics Letters, vol. 19, No. 6, Mar. 15, 1994, pp. 387–389.
Hill, "Bragg Gratings Fabrication In Monomode Photosensitive Optical Fiber By UV Exposure Through a Phase Mask", Application Phys. Letters, vol. 62, Nov. 10, Mar. 8, 1993, pp. 1035–1037.

*Primary Examiner*—Akm E. Ullah
*Attorney, Agent, or Firm*—Lee, Mann, Smith, McWilliams, Sweeney & Ohlson

[57] ABSTRACT

A Bragg reflection grating is written in photosensitive optical fiber using ultra-violet light from an ArF excimer laser with the aid of a phase grating to create a fringe pattern. The writing is effected by a type II damage process performed in two stages, the first of which involves the creation of a low reflectivity grating, which is incubated to greater reflectivity in the second stage. Incubation is performed without the use of any fringe pattern.

7 Claims, 3 Drawing Sheets

INCUBATED BRAGG GRATINGS IN WAVEGUIDES

BACKGROUND TO THE INVENTION

This invention relates to the creation of Bragg gratings in photosensitive optical waveguides. It is known that such a grating can be created by illuminating the photosensitive waveguide from the side, writing the lines simultaneously with an interferometrically generated grating fringe pattern of light. Such a fringe pattern can be created using two-beam interferometry, or as a fringe pattern generated in the vicinity of a diffraction grating, typically a phase grating, through which light is caused to pass.

Two broad regimes for producing gratings in photosensitive optical waveguides are known, respectively characterised as type I and type II. A type I grating is created by relatively low fluence exposure to a fringe pattern, and the refractive index change that is produced grows towards a saturation level with increasing fluence, which is normally, but not necessarily, provided on a cw basis. The manufacture of such type I gratings is for instance described in U.S. Pat. No. 4,474,427 (K O Hill et al) and U.S. Pat. No. 4,725,110 (W H Glenn et al). A type II grating is created by significantly higher fluence exposure to a fringe pattern, and the effect has been attributed to some 'damage' effect upon the core of the fibre. The manufacture of such a type II grating is for instance described by J L Archambault in a paper entitled 'High Reflectivity and Narrow Bandwidth Fibre Gratings Written by Single Excimer Laser Pulse', Electronics Letters (7 Jan. 1993), Vol. 29 No. 1, pp 28–29. Published papers on type II grating creation have recited the use of ultra-violet radiation at 248 nm from a KrF excimer laser, the fluence being confined to a single pulse typically of about 20 ns duration. The suggestion that the observed effect is a 'damage' effect is based upon observation of the effects of such fluences incident upon fibre preforms similar to those from which the optical fibres themselves were drawn. Damage is inferred when ablation from the surface of preforms is detected using a sensor that directs an interrogation beam of laser light laterally through a zone just above the point where the 248 nm ultra-violet light is incident upon the preform surface. When using a KrF excimer laser in this way, it is found that there is a relatively narrow safety margin between the fluence necessary to reach the lower threshold of the onset of refractive index modifying 'damage', and the fluence necessary to reach the upper threshold at which catastrophic disruption of the fibre is liable to occur.

For the purpose of this invention the term 'damage', as used in the context of Bragg grating creation, is defined to cover a process of creating a Bragg grating in a photosensitive waveguide using a fluence sufficient to produce ablation effects when applied to an optical fibre preform having the same optical core composition as that of the waveguide.

SUMMARY OF THE INVENTION

The present invention is directed to the avoidance of these problems associated with the creation of 'damage' type Bragg gratings using single pulse 248 nm radiation.

According to the present invention there is provided a method of creating a Bragg grating in a photosensitive optical waveguide wherein a seed Bragg grating of relatively lower refractive index difference modulation depth is created by exposure of the waveguide to a fringe pattern of illumination using one or more pulses of electromagnetic radiation of sufficient fluence to induce 'damage', as hereinbefore defined, and wherein said modulation depth is enhanced to a relatively higher refractive index difference modulation depth value by exposure of said seed Bragg grating to one or more further pulses of electromagnetic radiation of sufficient fluence to induce further 'damage' in the previously 'damaged' regions of the seed grating, wherein said exposure to said one or more further pulses is an exposure substantially devoid of any fringe pattern.

It has been found that the exposure of the seed grating to further fluence in order to enhance its modulation depth, which procedure may be termed 'incubation' of the grating, does not require the use of a fringe pattern, and so incubation can readily be performed at a different location from that at which the initial creation of the seed grating takes place. This facilitates the creating of such Bragg gratings in optical fibre as that fibre is being drawn from preform.

BRIEF DESCRIPTION OF THE DRAWINGS

There follows a description of the creation of Bragg reflector gratings in optical fibres by a method embodying the invention in a preferred form. For comparison purposes, this description of incubation resulting from illumination not having a fringe pattern is prefaced with a description of incubation resulting from illumination with a fringe pattern. The description refers to the accompanying drawings in which.

DETAILED DESCRIPTION OF A PREFERRED EMBODIMENT

Figure 1:
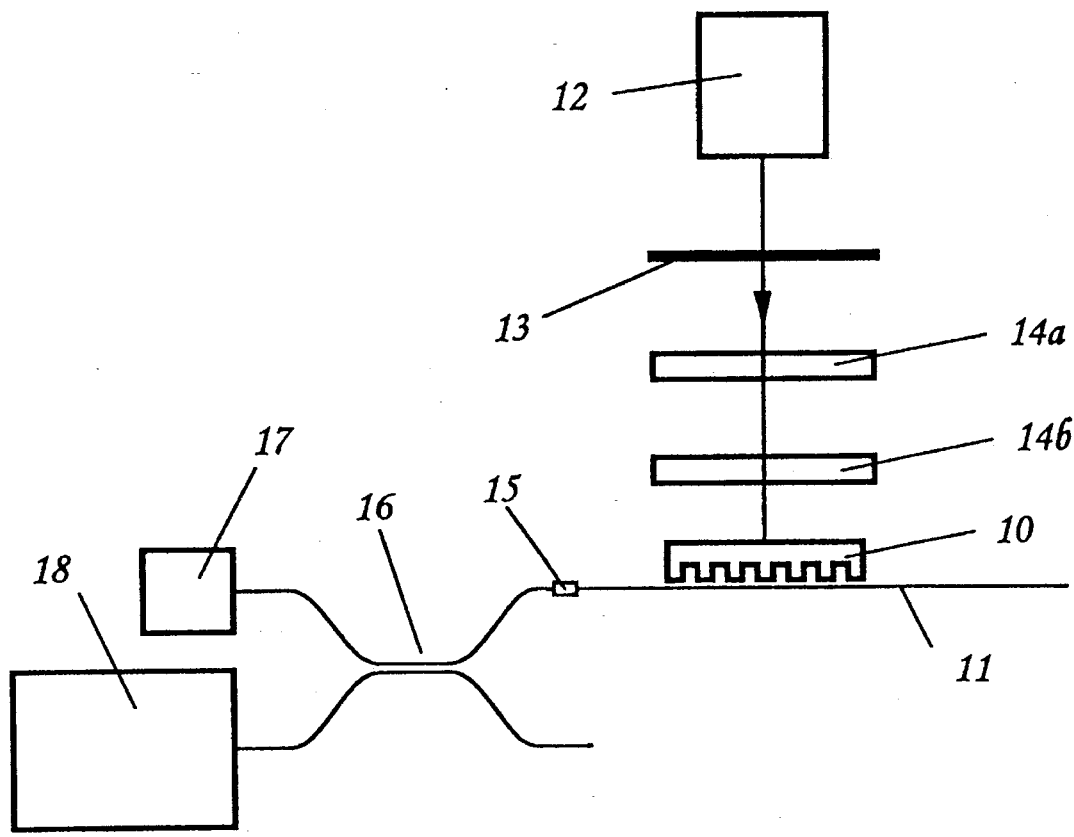
FIG. 1 is a schematic diagram of apparatus employed to create a seed Bragg grating.

A seed Bragg grating is created in a waveguide by laterally illuminating it with an interference fringe pattern of high intensity ultra-violet light. In the case of the apparatus of FIG. 1 this fringe pattern is generated with the aid of a diffraction grating, in particular a phase grating 10, upon which the ultra-violet light is normally incident. The depth of the grating elements of this phase grating is designed to suppress the zero order diffraction pattern. The waveguide in which the Bragg grating is to be created is a length 11 of single mode optical fibre which is located almost in contact with the grating 10 which is oriented so that its grating lines extend transversely of the fibre axis, preferably at right angles to that axis. Light from an ultra-violet emitting laser 12 is directed via a rectangular aperture 13 (to select the central substantially uniform fluence region of the laser's emission) and via two cylindrical lenses 14a and 14b on to the grating 10 so as to form a generally rectangularly shaped spot whose length is substantially matched to the length of the grating 10 and whose width may similarly be substantially matched to, or somewhat greater than, the width of the fibre 11. For monitoring purposes, the fibre 11 may be spliced at 15 to a 3 dB single mode 3 dB fibre coupler 16 so that the reflection of light launched into the fibre 11 from and ELED 17 can be monitored on some form of spectrum analyser 18. This monitoring arrangement is suitable for monitoring the creation of the Bragg reflector, but does not have the spectral resolution to measure the bandwidth of that reflector. This can be measured, as depicted in FIG. 2, by replacing the ELED 18 with a tuneable diode laser source 20 which is scanned under computer control in 0.001 nm (125 MHz) spectral steps across the bandwidth of the Bragg reflector while the reflected and transmitted powers are measured on two optical power meters 21. While bandwidth measurements are made, the 3 dB fibre coupler 16 and the fibre 11 (with its Bragg grating represented by lines 22) are preferably kept in a temperature controlled housing 23 in order to minimise errors in the results attributable to the effects of temperature upon the Bragg grating.

Figure 2:
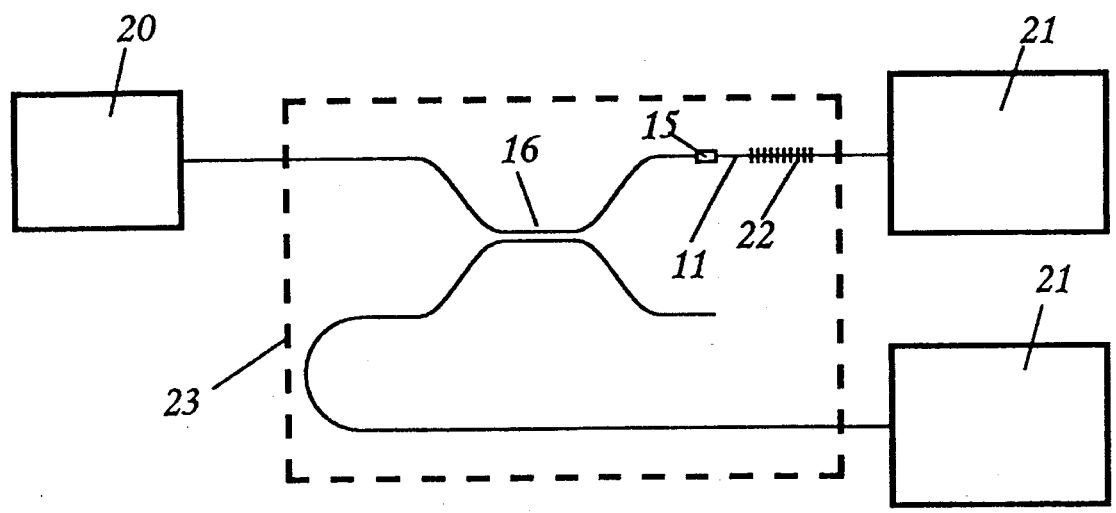
FIG. 2 is a schematic diagram of apparatus employed to analyse the spectral properties of seed or incubated Bragg gratings.
Figure 3:
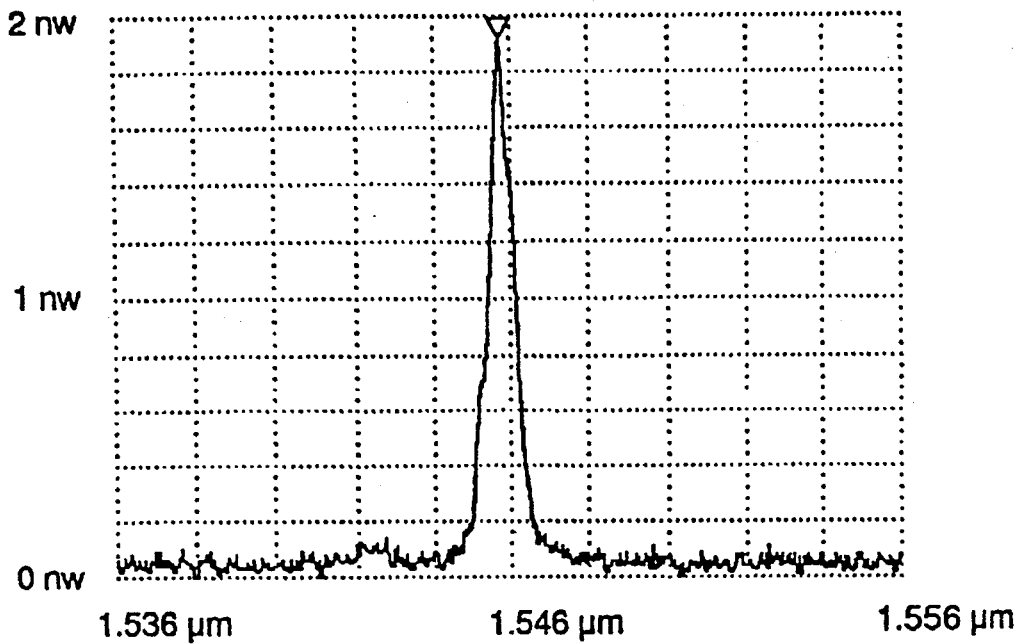
FIG. 3 is a plot of the spectral reflectivity of a Bragg reflector.

By way of example, the apparatus of FIG. 1 was used to create, in a single mode optical fibre with a 20 mole % germania doped silica core, a Bragg reflector whose spectral reflection characteristic is plotted in FIG. 3. For this purpose, the laser 12 was an ArF excimer laser with a conventional multimode resonator (no line narrowing) emitting linearly polarised light pulses of approximately 20 ns duration at 193 nm, and the phase grating 10 had a fundamental period of d=533 nm. The phase grating was originally designed as a Bragg-Lipman grating, and its order efficiencies, measured for normal incidence, were 14%; 4%; 26%; 20% and 20.5% for the −2, +2, −1, +1 and 0 orders respectively. The lenses 14 provided a spot size measuring approximately 3 mm by 0.3 mm exciting the phase grating 10, with an average fluence of 420 mJ cm$^{-2}$. For optimum alignment of the fibre 11 in close proximity to the phase grating 10 it was found that the Bragg reflection grating produced in the fibre increased steadily in reflectivity with successive pulses, reaching a maximum value of about 96% after about 10 pulses.

Figure 4:
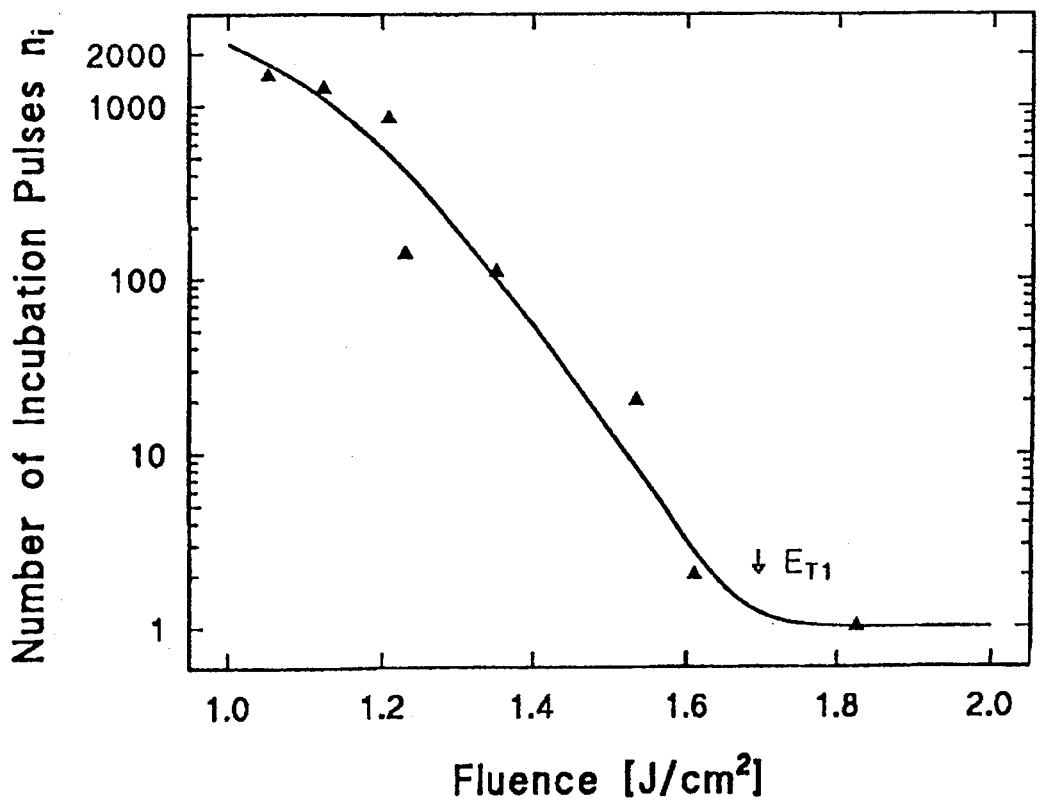
FIG. 4 is a plot of the number of incubation pulses required to initiate damage, measured as a function of pulse fluence.

The growth of grating reflectivity over a finite number of pulses is attributed to an incubation effect in which repeated exposure of the doped core leads to a progressive increase in its ultra-violet light absorption coefficient, and consequent fall in the damage threshold. Evidence for this progressive reduction in damage threshold is provided by the results of an experiment performed on a polished fibre preform having the same core composition as that of fibre 11. This preform was irradiated with pulses from the ArF excimer laser and, for a number of different fluences, the number of incubation pulses at that fluence level noted that were required before the onset of ablation. The onset of ablation was monitored using a highly sensitive HeNe laser probe beam deflection system which permits thermal signatures produced by heating of the preform surface to be distinguished from actual ablation (material removal). The results are plotted in FIG. 4, which shows that the ablation threshold fluence is dependent upon the number of incubation pulses such that although single pulse ablation requires fluence $\geq 1.7$ Jcm$^{-2}$, ablation will also occur at lower fluence after a finite number of incubation pulses have been delivered. A growth in the amplitude of the thermal signature during this incubation delay gives evidence for this effect arising from a photo-induced increase in the absorption coefficient of the sample.

Figure 5:
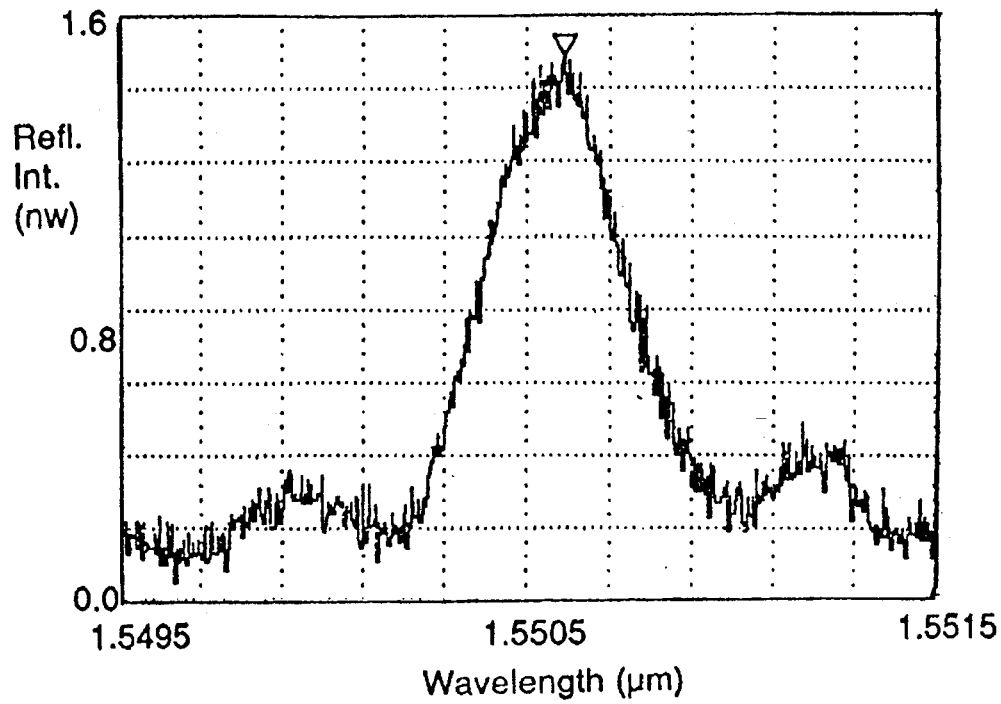
FIGS. 5 and 6 are plots respectively of spectral reflectivity and transmission of an example of Bragg reflector made by a method embodying the present invention in a preferred form.
Figure 6:
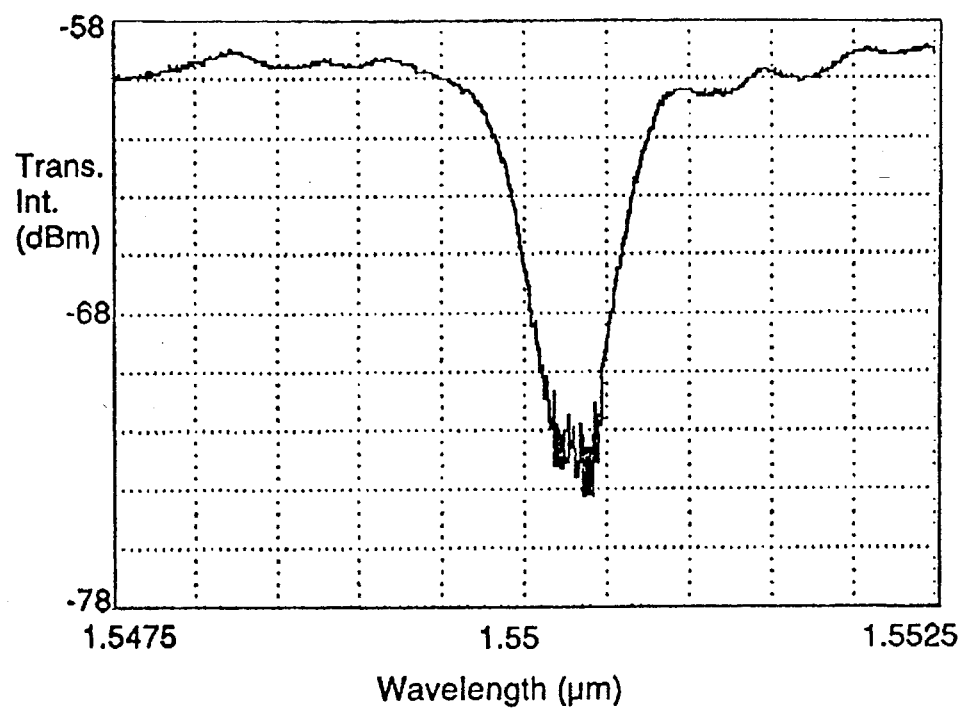

By way of an example embodying the invention in a preferred form, the same apparatus of FIG. 1 was used to create in a length of similar single mode fibre a Bragg reflector whose spectral reflection and transmission characteristics are respectively plotted in FIGS. 5 and 6. This second example is distinguished primarily from the first in that, with the phase grating 10 in position, a low reflectivity (typically in the range 1% to 10%) seed grating Bragg reflector is created in the fibre 11, and then, with the phase grating 10 removed, this seed grating is incubated by exposure to one or more further pulses of 193 nm light, thereby enhancing the reflectivity of the Bragg grating, for instance to 96% or greater. In a specific instance a seed grating Bragg reflector with a reflectivity of about 2% was created using a single pulse of about 650 mJ cm$^{-2}$ which was then incubated to a reflectivity of about 60% by means of a single further pulse (with the phase grating removed) of about 800 mJ cm$^{-2}$. In general the use of a single incubation pulse produced the greatest reflectivity, with further pulses causing the reflectivity to decline.

Incubation effects are also observable with Bragg gratings created using the longer wavelength of 248 nm from a KrF excimer laser, but the enhancement is weaker and is generally found more difficult to control. This may be attributable to the fact that the absorption of the germania doped core is less at 248 nm than 193 nm, and hence a greater fluence is needed to initiate damage, this initiation fluence being significantly nearer that producing catastrophic damage to the fibre than is the case when irradiating with 193 nm light.

We claim:

1. A method of creating a Bragg grating in a photosensitive optical waveguide which method includes the step of creating a seed Bragg grating of relatively lower refractive index difference modulation depth by exposure of the waveguide to a fringe pattern of illumination using one or more pulses of electromagnetic radiation of sufficient fluence to induce 'damage', sufficient fluence to induce 'damage' being defined to mean fluence that is sufficient, when applied to an optical fibre preform having the same optical core composition as that of the waveguide, to produce ablation effects, which step is succeeded by the step of enhancing said modulation depth to a relatively higher refractive index difference modulation depth value by exposure of said seed Bragg grating to one or more further pulses of electromagnetic radiation of sufficient fluence to induce further 'damage' in the previously 'damaged' regions of the seed grating, wherein said exposure to said one or more further pulses is an exposure substantially devoid of any fringe pattern.

2. A method as claimed in claim 1, wherein said exposure of the waveguide to a fringe pattern of illumination is a single pulse exposure.

3. A method as claimed in claim 1, wherein said exposure of the waveguide to said one or more further pulses is a single pulse exposure.

4. A method as claimed in claim 1, wherein said exposure of the waveguide to a fringe pattern of illumination, is an exposure to the emission of an ArF excimer laser.

5. A method as claimed in claim 1, wherein said exposure of the waveguide to said one or more further pulses is an exposure to the emission of an ArF excimer laser.

6. An optical waveguide provided with a Bragg grating by the method claimed in claim 1.

7. An optical waveguide as claimed in claim 6, which waveguide is an optical fibre.

* * * * *